US006155356A

United States Patent [19]

Kikuchi et al.

[11] Patent Number: 6,155,356

[45] Date of Patent: Dec. 5, 2000

[54] PERCUSSION TOOL

[75] Inventors: Atsuyuki Kikuchi, Hitachinaka; Sinki Ohtsu, Ibaraki-ken; Mutsuo Harada; Akihisa Yahagi, both of Hitachinaka, all of Japan

[73] Assignee: Hitachi Koki Co., Ltd., Tokyo, Japan

[21] Appl. No.: 09/426,635

[22] Filed: Oct. 25, 1999

[30] Foreign Application Priority Data

Oct. 23, 1998 [JP] Japan .................................. 10-302098

[51] Int. Cl.[7] ............................... B23B 45/16; B25D 9/16

[52] U.S. Cl. ......................... 173/211; 173/128; 279/19.1; 279/19.6

[58] Field of Search .................................... 173/210, 211, 173/128, 200, 201, 135, 104; 279/19.1, 19.3, 19.5, 19.6

[56] References Cited

U.S. PATENT DOCUMENTS

| | | | |
|---|---|---|---|
| 4,113,035 | 9/1978 | Stiltz et al. | 173/104 |
| 4,442,906 | 4/1984 | Simpson | 173/201 |
| 5,431,235 | 7/1995 | Drumheller et al. | 173/211 |
| 5,873,418 | 2/1999 | Arakawa et al. | 173/201 |
| 6,056,070 | 5/2000 | Shinohara et al. | 173/128 |

*Primary Examiner*—Scott A. Smith

*Attorney, Agent, or Firm*—Pollock, Vande Sande & Amernick

[57] ABSTRACT

A hammer holder, provided between a retainer sleeve and a cylinder, slidably holds an intermediate member in an axial direction. A predetermined clearance is maintained between the hammer holder and the retainer sleeve. The hammer holder has a recessed portion which is engageable with a flange of the intermediate member so as to restrict the slide movement of the intermediate member. A cushioning member receives a percussion force when the flange is stopped by the recessed portion. The clearance restricts a compression amount of the cushioning member so that a predetermined life of the cushioning member is assured.

7 Claims, 3 Drawing Sheets

PERCUSSION TOOL

BACKGROUND OF THE INVENTION

The present invention relates to a percussion or impact tool, such as an electrically operated hammer, which comprises an intermediate member for transmitting a reciprocative movement of a striking member to a tool bit positioned at a front end of the percussion tool.

An air spring is conventionally used to cause the striking member to reciprocate. The intermediate member receives the percussion energy caused by the reciprocative movement of the striking member, and transmits the percussion energy to the tool bit to cause the percussive motion of the tool bit in the axial direction. The percussive movement of the tool bit is directly transmitted to a concrete or similar material to be drilled or cut, while the tool bit receives a reaction or rebound force acting from the drilled or cut material. In such a loaded condition, the percussion force is effectively transmitted to the drilled or cut material through the transmitting mechanism including the striking member, the intermediate member, and the tool bit.

When a drilling or cutting work is finished, an operator releases the percussion tool from the drilled or cut material. However, immediately after finishing the drilling or cutting operation, the air-spring type percussion tool still operates. The percussion force transmitting mechanism does not immediately stop and continues to transmit the reciprocative movement for a while. Namely, the percussion force transmitting mechanism is suddenly released from the loaded condition and left in a non-loaded condition. The percussion force is no longer transmitted to the drilled or cut material and must be absorbed by the percussion tool itself. In this case, there is the possibility that a part of the percussion force transmitting mechanism, e.g., the intermediate member, may excessively hit other parts in the percussion tool and may damage the same.

SUMMARY OF THE INVENTION

An object of the present invention is to provide a percussion tool capable of preventing the internal components from being damaged by the percussion force in the non-loaded condition and for extending the life of the percussion tool.

In order to accomplish this and other related objects, the present invention provides a first percussion tool comprising a striking member reciprocating in a cylinder in responsive to a driving force given from a motor, an intermediate member struck by the striking member, a tool bit provided at a front end of the percussion tool and struck by the intermediate member, and a retainer sleeve for holding the tool bit so as to be slidable in an axial direction thereof. The first percussion tool is characterized in that a hammer holder is provided between the retainer sleeve and the cylinder for slidably holding the intermediate member in an axial direction thereof, and a predetermined clearance is maintained between the hammer holder and the retainer sleeve. The hammer holder has a recessed portion which is engageable with a flange of the intermediate member so as to restrict the slide movement of the intermediate member. And, a cushioning member is provided for receiving a percussion force when the flange is stopped by the recessed portion.

Preferably, the clearance restricts a compression amount of the cushioning member so that a predetermined life of the cushioning member is assured.

It is preferable that the cushioning member is provided between the hammer holder and a front cover accommodating the hammer holder.

Preferably, the life of the cushioning member is substantially identical with the life of the percussion tool. According to a preferable embodiment, the life of the cushioning member is equivalent to repetitive $1\times10^7$ percussions.

Preferably, the cushioning member is a urethane rubber having a rubber hardness equivalent to HS 90.

Furthermore, the present invention provides a second percussion tool comprising a retainer sleeve for holding a tool bit so as to be slidable in an axial direction thereof, a front cover holding the retainer sleeve and fixed to a tool body, a first hammer holder slidably guided by the front cover and receiving a rebound force transmitted from an intermediate member, a second hammer holder engaged with the first hammer holder and having a recessed portion formed on an inside surface thereof for restricting an axial forward shift movement of the intermediate member. The intermediate member is slidably held by the retainer sleeve and the second hammer holder. The second percussion tool further comprises a cushioning member interposed between the front cover and the second hammer holder for receiving a percussion force transmitted from the intermediate member in a non-loaded condition. And, a clearance is provided between a front end of the second hammer holder and a rear end of the retainer sleeve for regulating a deformation amount of the cushioning member.

BRIEF DESCRIPTION OF THE DRAWINGS

The above and other objects, features and advantages of the present invention will become more apparent from the following detailed description which is to be read in conjunction with the accompanying drawings, in which.

DESCRIPTION OF A PREFERRED EMBODIMENT

Figure 1:
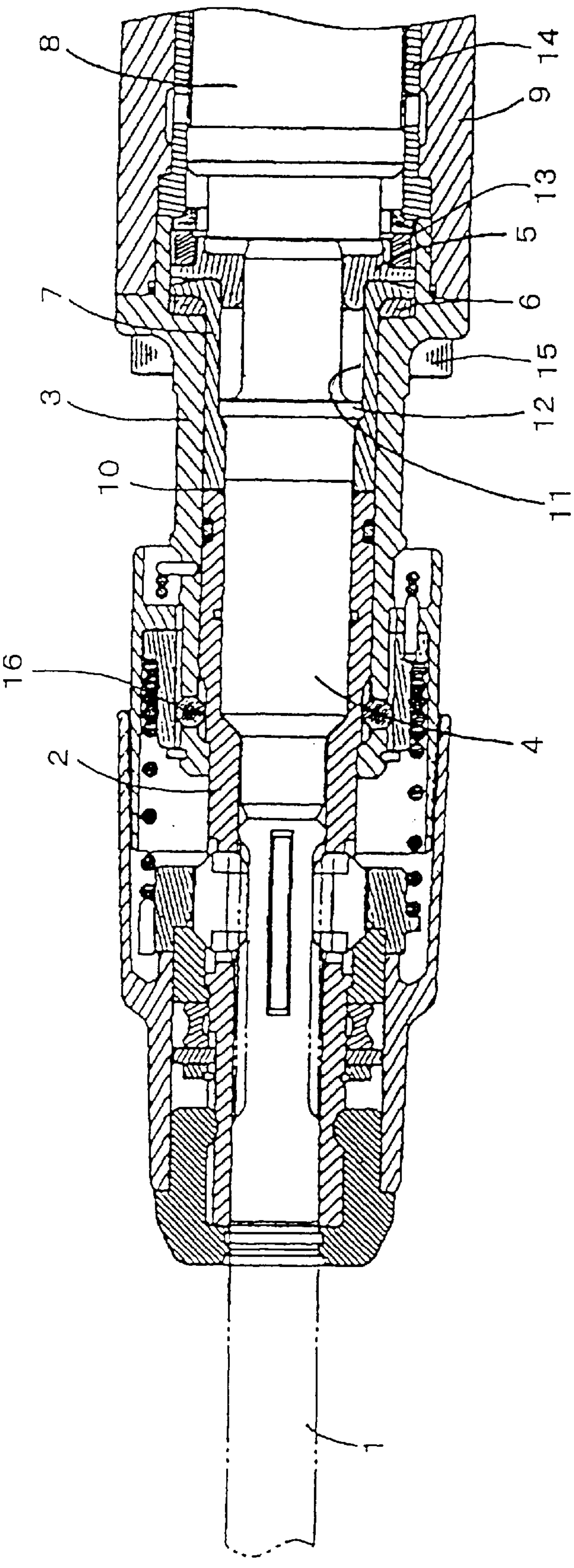
FIG. 1 is a vertical cross-sectional view showing a percussion tool in accordance with a preferable embodiment of the present invention, explaining a striking operation in a non-loaded condition.
Figure 2:
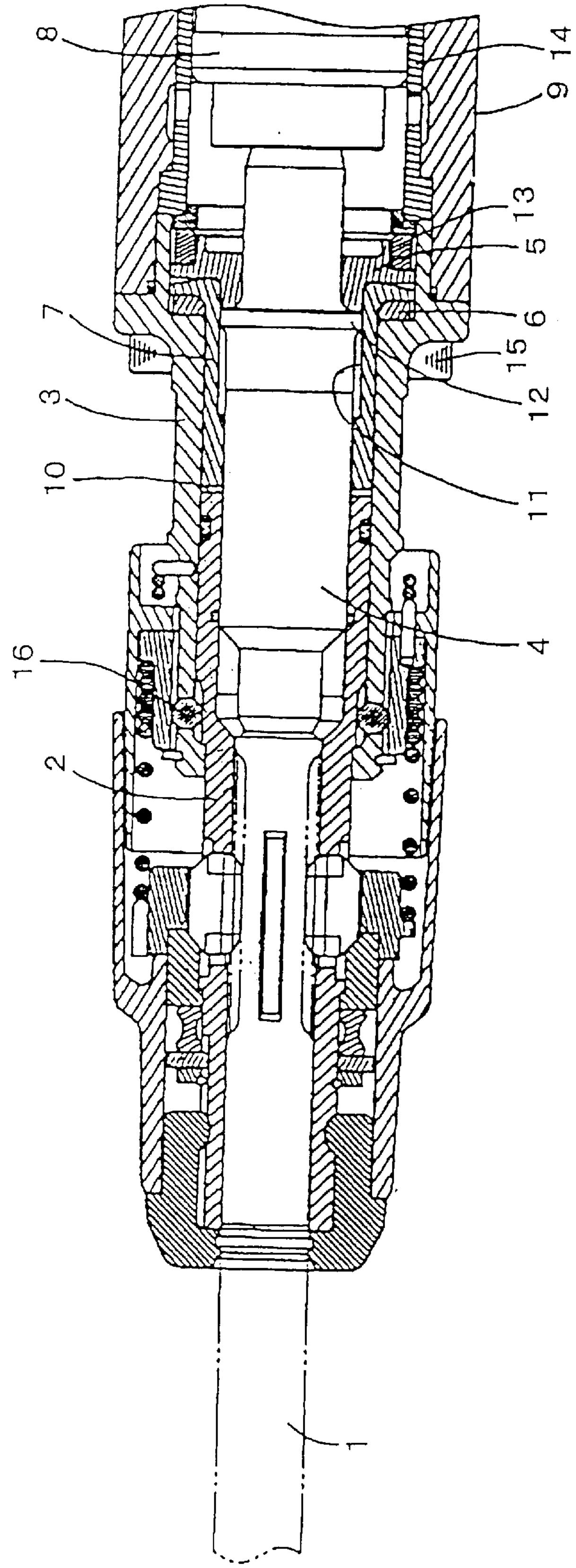
FIG. 2 is a vertical cross-sectional view showing the percussion tool in accordance with the preferred embodiment of the present invention, explaining a striking operation in a loaded condition.
Figure 3:
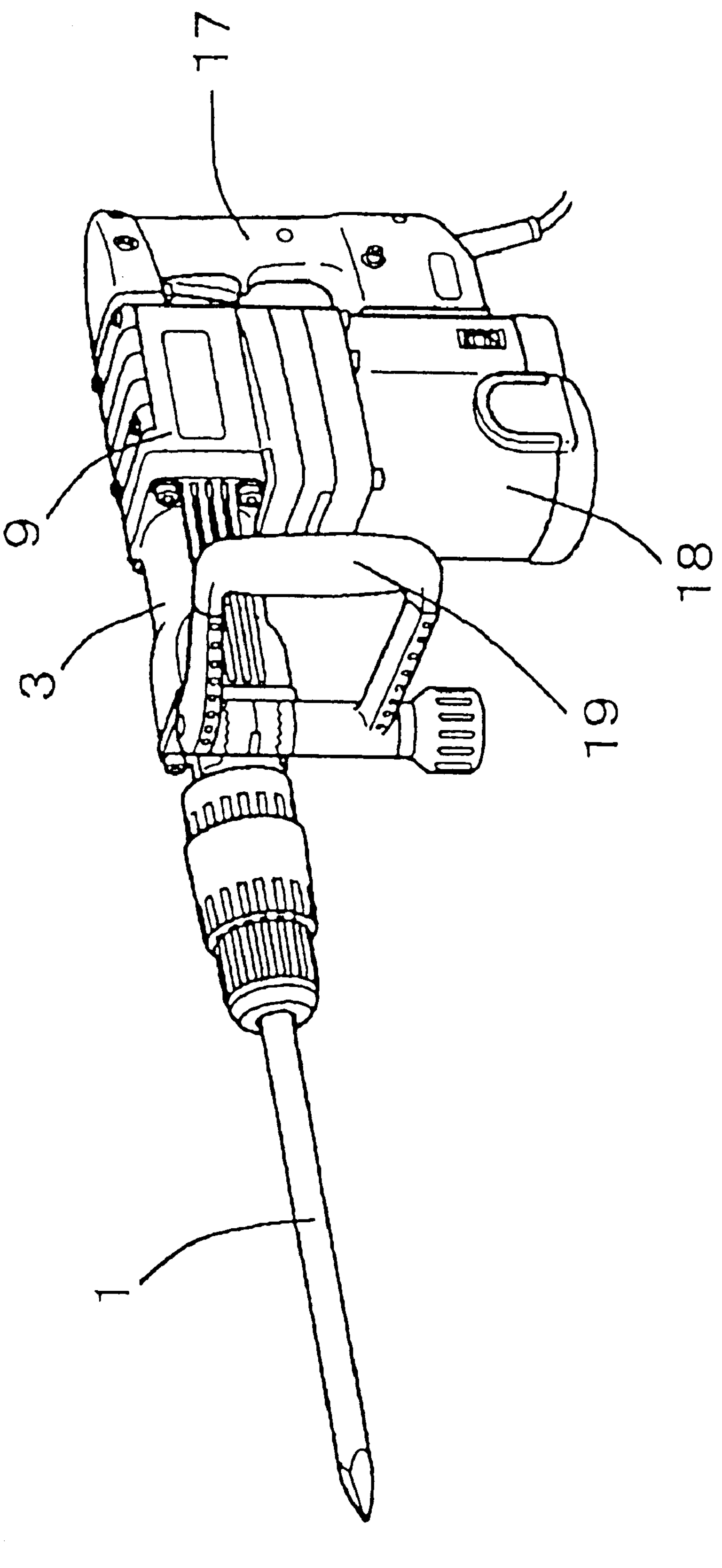
FIG. 3 is a perspective view showing an appearance of the percussion tool in accordance with the preferred embodiment of the present invention.

A preferred embodiment of the present invention will be explained with reference to the attached drawings. Identical parts are denoted by the same reference numerals throughout the views. In FIGS. 1 to 3, numeral 1 represents a tool bit. Numeral 2 represents a retainer sleeve. Numeral 3 represents a front cover. Numeral 4 represents an intermediate member. Numeral 5 represents a first hammer holder. Numeral 6 represents a first cushioning member. Numeral 7 represents a second hammer holder. Numeral 8 represents a striking member. Numeral 9 represents a tool body. Numeral 10 represents a clearance. Numeral 11 represents a recessed portion. Numeral 12 represents a flange of the intermediate member 4. Numeral 13 represents a second cushioning member. Numeral 14 represents a cylinder. Numeral 15 represents a bolt. Numeral 16 represents a boll. Numeral 17 represents a handle. Numeral 18 represents a motor. And, numeral 19 represents a side handle.

As shown in FIG. 3, the tool bit 1 is provided at a front end of the percussion tool. A percussion or impact force is transmitted from the motor 18 to the tool bit 1 via a percussion force transmitting mechanism accommodated in the tool body 9. The motor 18 is disposed at a lower portion of the percussion tool. The handle 17 and the side handle 19 are provided to allow an operator to easily hold and operate the percussion tool. A power on-and-off switch (not shown) is provided on or near the handle 17. The handle 17 is positioned at the rear end of the tool body 9 and also at the rear end of the motor 18. The side handle 19 is positioned at a front side of the front cover 3.

The tool bit 1 is held by a tool bit receiver which is swingable relative to the front cover 3 so that the angle of tool bit 1 is changeable with respect to the tool body 9.

FIG. 2 shows a striking operation of the percussion tool under a loaded condition where the tool bit 1 pushes or strikes a concrete or similar material to be drilled or cut. A rotational motion of the motor 18 is converted into a reciprocative movement of the piston (not shown) through an appropriate driving force transmitting mechanism (not shown). The reciprocative movement of the piston is transmitted via an air chamber (not shown) to the striking member 8. The striking member 8 is slidably accommodated in the cylinder 14 and reciprocates in the axial direction of the cylinder 14. The reciprocative movement of the striking member 8 is continuously transmitted to the tool bit 1 via the intermediate member 4. Thus, the tool bit 1 transmits the percussion or impact force to the concrete or similar material to be drilled or cut.

The tool bit 1 and the intermediate member 4 are shiftable in the axial direction. The percussion or impact force is transmitted via the striking member 8, the intermediate member 4 and the tool bit 1 which constitute the percussion force transmitting mechanism. The retainer sleeve 2 and the second hammer holder 7 are coaxial with each other and located around the striking member 8, the intermediate member 4 and the tool bit 1. In the loaded condition, substantially no percussion or impact force is transmitted to the retainer sleeve 2 and the second hammer holder 7.

The second hammer holder 7 is disposed at the rear end of the retainer sleeve 2. The clearance 10 is provided between the second hammer holder 7 and the retainer sleeve 2 to space or separate the second hammer holder 7 from the retainer sleeve 2 in the axial direction. The second hammer holder 7 is a cylindrical sleeve having a first inner cylindrical wall having a diameter equivalent to the outer diameter of the intermediate member 4 having a cylindrical body. The first inner cylindrical wall is located at the front end side of the second hammer holder 7 near the tool bit 1. The intermediate member 4 is thus slidably held by the first inner cylindrical wall of the second hammer holder 7. The second hammer holder 7 has a second inner cylindrical wall defining the recessed portion 11 which has a slightly larger diameter equivalent to the outer diameter of the flange 12 formed at the rear end of the intermediate member 4. The diameter of the flange 12 is slightly larger than the diameter of the intermediate member 4. When the intermediate member 4 shifts forward, the flange 12 is stopped by the front end of the recessed portion 11.

The second hammer holder 7 has a rear end flange extended in the radially outer direction. The first cushioning member 6 is provided between the radially extended rear end flange of the second hammer holder 7 and the front cover 3. The first cushioning member 6 is made of a urethane rubber having a rubber hardness equivalent to HS 90.

The first hammer holder 5 is disposed at the rear end of the hammer holder 7. The first hammer holder 5 is slidably guided by the front cover 3 and receives a rebound force transmitted from the intermediate member 4. The second cushioning member 13 is disposed at the rear end of the first hammer holder 5. The second cushioning member 13 serves as a shock absorber which receives the percussion or impact force acting from the intermediate member 7 in the rearward direction when the tool bit 1 receives a reaction or rebound force from the drilled or cut material. The radially extended rear end flange of the second hammer holder 7 has a conical surface which is brought into contact with the first hammer holder 5. In other words, the radially extended rear end flange of the second hammer holder 7 is partly brought into contact with the first hammer holder 5 so that the rear end flange of the second hammer holder 7 is not broken by the percussion or impact force.

From the condition shown in FIG. 2, the operator releases the pushing force applied to the percussion tool. The tool bit 1 is disengaged from the drilled or cut material. This condition is referred to as a non-loaded condition. On the other hand, the condition where the tool bit 1 is brought into contact with the drilled or cut material under the pushing force is referred to as the loaded condition.

In the non-loaded condition, the tool bit 1 is shiftable forward relative to the tool body 9. The tool bit 1 and the intermediate member 4 shift forward in response to the reciprocative movement of the striking member 8 as shown in FIG. 1.

The front end position of the tool bit 1 is restricted by an appropriate limiting member. When the tool bit 1 is positioned at the frontmost position, a predetermined clearance is provided between the tool bit 1 and the intermediate member 4. The intermediate member 4 can shift forward until the flange 12 is stopped by with the front end of the recessed portion 11 of the second hammer holder 7. The first cushioning member 6 absorbs the shock caused when the flange 12 hits the front end of the recessed portion 11. It is desirable that the life of the first cushioning member 6 is substantially identical with the life of the percussion tool. For instance, the life of the first cushioning member 6 is equivalent to repetitive $1 \times 10^7$ percussions.

To assure the shock absorbing ability equivalent to repetitive $1 \times 10^7$ percussions, it is necessary to limit the compression amount of the first cushioning member 6 to an appropriate level when the first cushioning member 6 receives the percussion or impact force.

According to this embodiment, the first cushioning member 6 is a urethane rubber having a thickness of 5.0 mm. The shock absorbing ability equivalent to repetitive $1 \times 10^7$ percussions can be assured when the compression amount is restricted within 0.5 mm. In view of this, the clearance 10 provided between the second hammer holder 7 and the retainer sleeve 2 is set to 0.5 mm in a condition where the first cushioning member 6 is not compressed. When the first cushioning member 6 is compressed by an amount of 0.5 mm, the second hammer holder 7 is brought into contact with the retainer sleeve 2. In this condition (shown in FIG. 1), a slight clearance is maintained between a front conical surface of the intermediate member 4 and a corresponding conical inner surface of the retainer sleeve 2. Thus, the axial shift movement of the intermediate member 4 is not restricted by the retainer sleeve 2. In other words, no percussion or impact force is transmitted from the intermediate member 4 to the retainer sleeve 2.

With the above-described arrangement, the first cushioning member 6 absorbs the shock caused when the intermediate member 4 shifts forward. The bolt 15, serving as a fastening member for securely connecting the front cover 3 with the tool body 9, is not subjected to an excessive force. As a result, the connecting portion between the tool body 9 and the handle 17 is not subjected to an excessive percussion or impact force.

Accordingly, it becomes possible to reduce the stress acting on the connecting portion between the tool body 9 and the handle 17. For example, when the conventional percussion tool causes a large stress reaching 14.7 $kg/mm^2$, the present invention makes it possible to reduce the stress to a lower level equivalent to 4.9 $kg/mm^2$ which is sufficiently lower than the allowable stress (approximately 9.8 $kg/mm^2$) at the connecting portion between the tool body 9 and the handle 17.

In addition, the clearance 10 substantially restricts the compression amount of the first cushioning member 6 so as to assure the life of the first cushioning member 6 equivalent to repetitive $1\times10^7$ percussions. As a result, it becomes possible to provide a long-life and reliable percussion tool.

This invention may be embodied in several forms without departing from the spirit of essential characteristics thereof. The present embodiment as described is therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. A percussion tool comprising:

a striking member reciprocating in a cylinder in responsive to a driving force given from a motor;

an intermediate member struck by said striking member;

a tool bit provided at a front end of said percussion tool and struck by said intermediate member;

a retainer sleeve for holding said tool bit so as to be slidable in an axial direction thereof;

a hammer holder provided between said retainer sleeve and said cylinder for slidably holding said intermediate member in an axial direction thereof, so that a predetermined clearance is maintained between said hammer holder and said retainer sleeve;

a recessed portion of said hammer holder engageable with a flange of said intermediate member so as to restrict the slide movement of said intermediate member; and a cushioning member for receiving a percussion force when said flange is stopped by said recessed portion.

2. The percussion tool in accordance with claim 1, wherein said clearance restricts a compression amount of said cushioning member so that a predetermined life of said cushioning member is assured.

3. The percussion tool in accordance with claim 1, wherein said cushioning member is provided between said hammer holder and a front cover accommodating said hammer holder.

4. The percussion tool in accordance with claim 1, wherein the life of said cushioning member is substantially identical with the life of said percussion tool.

5. The percussion tool in accordance with claim 1, wherein the life of said cushioning member is equivalent to repetitive $1\times10^7$ percussions.

6. The percussion tool in accordance with claim 1, wherein said cushioning member is a urethane rubber having a rubber hardness equivalent to HS 90.

7. A percussion tool comprising:

a retainer sleeve for holding a tool bit so as to be slidable in an axial direction thereof;

a front cover holding said retainer sleeve and fixed to a tool body;

a first hammer holder slidably guided by said front cover and receiving a rebound force transmitted from an intermediate member;

a second hammer holder engaged with said first hammer holder and having a recessed portion formed on an inside surface thereof for restricting an axial forward shift movement of said intermediate member;

said intermediate member slidably held by said retainer sleeve and said second hammer holder;

a cushioning member interposed between said front cover and said second hammer holder for receiving a percussion force transmitted from said intermediate member in a non-loaded condition; and a clearance provided between a front end of said second hammer holder and a rear end of said retainer sleeve for regulating a deformation amount of said cushioning member.

* * * * *